United States Patent [19]

Nakamura et al.

[11] Patent Number: 5,089,208
[45] Date of Patent: Feb. 18, 1992

[54] METHOD OF MOLDING A SYNTHETIC-RESIN HOLLOW CONTAINER WITH GRIP

[75] Inventors: Yoshinori Nakamura; Yoshiki Miyazawa; Shigeo Yoshizawa, all of Nagano, Japan

[73] Assignee: Nissei ASB Machine Co, Ltd., Japan

[21] Appl. No.: 103,936

[22] Filed: Nov. 16, 1987

Related U.S. Application Data

[62] Division of Ser. No. 11,277, Feb. 4, 1987, Pat. No. 4,727,997.

[30] Foreign Application Priority Data

Feb. 6, 1986 [JP] Japan .................. 61-24856

[51] Int. Cl.$^5$ .............. B29C 49/06; B29C 49/08; B29C 49/18
[52] U.S. Cl. .................. 264/513; 215/1 C; 215/100 A; 264/530; 264/537; 425/525
[58] Field of Search .............. 215/1 C, 100 A; 264/513, 516, 250, 274, 259, 530, 537; 425/525, 127

[56] References Cited

U.S. PATENT DOCUMENTS

| | | |
|---|---|---|
| 2,007,993 | 7/1935 | Zahniser, Jr. et al. .............. 264/259 |
| 3,120,974 | 2/1964 | Matson . | |
| 3,140,329 | 7/1964 | Nutting .............. 264/274 |
| 3,357,056 | 12/1967 | Reyburn .............. 264/250 |
| 3,846,902 | 11/1974 | Sebring .............. 264/274 |
| 3,917,789 | 11/1975 | Heisler .............. 264/258 |
| 4,280,859 | 7/1981 | Thompson .............. 264/513 |
| 4,363,415 | 12/1982 | Rainville . | |
| 4,518,554 | 5/1985 | Hatakeyama et al. .............. 425/127 |

FOREIGN PATENT DOCUMENTS

| | | |
|---|---|---|
| 2613735 | 10/1977 | Fed. Rep. of Germany . |
| 2494179 | 5/1982 | France . |
| 60147319 | 8/1985 | Japan . |

Primary Examiner—Jan H. Silbaugh
Assistant Examiner—Catherine Timm
Attorney, Agent, or Firm—Ostrolenk, Faber, Gerb & Soffen

[57] ABSTRACT

A hollow container having a grip is formed by injection molding the grip and annular rings onto a blow molded container. An injection molded parison is first stretch blow molded to form a hollow container body having annular grooves. The hollow container body is then placed in a mold having molding grooves and a grip molding cavity. The molding grooves on the mold and the annular grooves on the container body together define connecting ring molding cavities. A pressure higher than ambient pressure is applied to the interior of the hollow container body. Then the grip and connecting rings are formed onto the hollow container body by injection filling the grip and connecting ring molding cavities.

5 Claims, 2 Drawing Sheets

METHOD OF MOLDING A SYNTHETIC-RESIN HOLLOW CONTAINER WITH GRIP

This is a divisional of application Ser. No. 011,277, filed Feb. 4, 1987 now U.S. Pat. No. 4,727,997.

BACKGROUND OF THE INVENTION (1) Field of the Invention

This invention relates to a hollow container with a grip such as a synthetic resin bottle in which a blow-molded container body has on its side a secondarily molded grip, and a method of molding the same.

(2) Description of the Prior Art

Two conventional methods are used to mold of a hollow container with a grip. One method involves blow molding an extrusion-molded parison into a hollow container and inflating a part of the parison toward the side of the container body to form the grip. However, in the stretch blow molding the parison is axially stretched within a blow mold and the wall thickness of the molded container is extremely thin when compared with one obtained by blow molding. This makes it difficult to mold the grip and such blow molding is therefore not employed.

The other method involves injection molding a closed-end parison and integrally premolding a grip on the side of a mouth without the need to blow mold. This method of premolding a grip on the parison mouth forming a mouth of a container may be applied also to the stretching blow molding. However, since the grip is molded, the mouth must be formed to be longer than that of a normal container, and the shape or configuration thereof becomes a special shape such as a long-neck bottle. This method poses a problem in that it is hard to be employed for containers which are generally widely used.

SUMMARY OF THE INVENTION

This invention has been accomplished in order to solve the aforementioned Problems as noted above with respect to prior art. It is an object of the present invention to provide a new hollow container in which a synthetic resin container obtained by stretch blow molding an injection molded parison is used to form a container body having a grip on its side.

It is a further object of the present invention to provide a method of molding a hollow container with a grip wherein a hollow container secondarily molded on the side of is initially molded and thereafter a grip is container body irrespective of the molding method used to form the hollow container itself, and wherein the and a grip is not disengaged from the container body despite the fact that the grip is secondarily formed on a blow or stretch blow molded container.

In a hollow container having a grip according to present invention a biaxially oriented container body having annular grooves in its outer periphery is formed by stretching blow molding and thereafter a synthetic resin grip is injection molded onto the container body. The resin grip is formed with connecting rings which are received in the annular grooves of the container body such that the grip is mounted on the side of the container body by engagement between the connecting rings and the annular grooves. The annular grooves are molded on the peripheral side of the container body within the blow mold simultaneously with blow molding of a hollow container such as a synthetic resin bottle. The grip member is preferably molded, after the container body has been removed from the blow mold, by inserting it into a grip molding mold in the form of a split mold provided with a grip molding cavity connected to a container receiving portion and the annular grooves. Injection molding is then carried out by pouring molten resin into the mold after applying internal pressure to the preformed container and filling the annular grooves with the result that said grip molding cavity with resin, and a grip is formed the side of the container body integrally with the connecting rings fitted in the annular grooves.

In the hollow container with a grip molded by the means described above, since the connecting rings are fitted in the annular grooves formed in the shell and integrally connected, even if the container is held by gripping the grip, the container body will not slip out of the grip due to the weight of contents. Furthermore, since resin is poured into the blow molded container to mold the grip, the grip may be molded without being affected by the molding method used to mold the container itself thereby permitting great flexibility in the shape of the molded container itself.

BRIEF DESCRIPTION OF THE DRAWINGS

The drawings show a hollow container with a grip according to this invention, steps of molding the container, and a mold device with a container body being shown in longitudinal section, in which.

DESCRIPTION OF THE PREFERRED EMBODIMENTS

Figure 1:
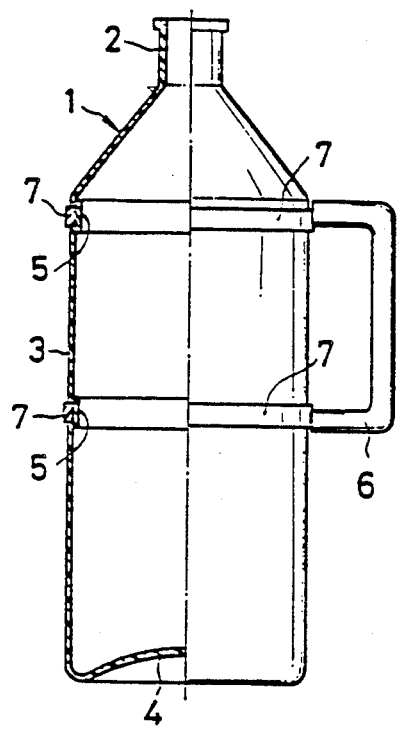
FIG. 1 is a longitudinal sectional front view of a half of a hollow container with a grip.

In the drawings, reference numeral 1 designates a body of a container in the form of a bottle produced by stretch blow molding an injection-molded closed-end parison within a blow mold, in which a shell 3 and a bottom 4 but not a neck 2, are biaxially oriented.

Two spaced apart annular grooves 5, 5 are formed simultaneously with the molding of the body in the outer peripheral surface of the shell 3.

A grip, indicated at 6 is formed integral with two connecting rings 7, 7 which are received in respective annular grooves 5, 5.

Figure 2:
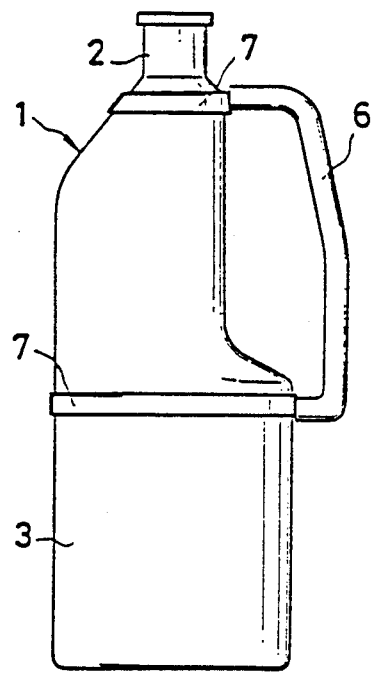
FIG. 2 is a front view showing a further example.

FIG. 2 shows an example in which the upper connecting ring 7 is provided at the lower side of the neck 2.

Next, a molding method for a hollow container shown in FIG. 3–6 will be described.

An injection-molded closed-end parison 11 is received into a cavity of a blow mold 14 in the form of a split mold with a neck 13 held by a neck mold 12, and stretching blow molding is carried out. In molding, axial stretching is carried out by an elongated rod 16 in the central portion of a blow core 15 fitted into the neck 13 through the neck mold 12 and air is blown from the blow core 15 into the parison 11 to fully expand the parison 11 in the cavity. The shell 3 of the container body 1 obtained by said molding is biaxially oriented. The neck 13 of the parison 11 constitutes the neck 2 of the container body 1 without modification.

In molding of the container body 1 two upper and lower annular projections 17, 17 are provided parallel to each other in a spaced apart relation on the surface of the cavity of the blow mold 14. As a result, annular grooves 5, 5 are formed in the outer peripheral side of the shell 3 of the container body 1 by the annular projections 17, 17 simultaneously with molding of the container body.

Figure 5:
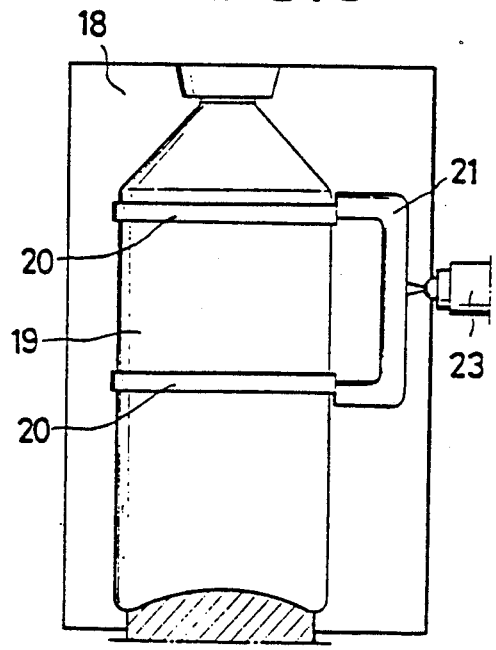
FIG. 5 is a front view showing a half of a grip molding mold.
Figure 6:
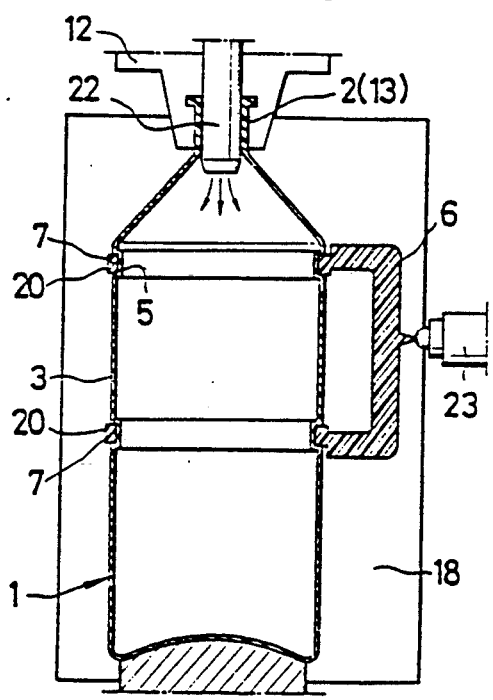
FIG. 6 is a front view showing a half of a mold when a grip is being molded.

(See FIG. 4), the container body 1 is removed from the blow mold 12 and transferred to the grip molding mold 18 (FIG. 5). This transfer of the container body 1 may be carried out by the neck mold 12 in the case where molding of the container body and molding of the grip are continuously carried out within one and the same machine, but when molding of the grip is carried out by the mold provided on a separate apparatus, the container body 1 is held by a removing machine and transported to a position of the mold.

The grip molding mold 18 is composed of a split mold provided with a recess which forms a receiving portion 19 having the same dimension as that of the container body 1, and molding grooves 20, 20 in the same position as that of the annular grooves 5, 5 are formed in the surface of the recess. A cavity 21 connected to the annular grooves 5, 5 is provided on one end of the molding grooves 20, 20 while being positioned in the parting surface.

The container body 1 is then inserted into the receiving portion 19 by closing the grip molding mold 18 (FIG. 6), clamping is carried out, air is then blown by means of an air nozzle 22 set in the neck mold 12, air pressure of the order of 5 to 10 kg is applied to the container body 1, and molten resin is poured under low pressure into the mold from an injection cylinder 23 in nozzle touch with the mold. The resin is filled in an annular cavity formed by the annular groove 5 and the molding groove 20 and in a grip molding cavity, where a grip 6 integral with the connecting rings 7, 7 is formed.

Since the connecting rings 7, 7 and the grip 6 are molded by low pressure filling, sink marks tend to occur when they are cooled, and therefore, air pressure in the range of 20 to 30 kg is applied into the container for pressurization after injection and filling have been completed.

After the grip 6 has been molded in the manner as described above, air pressure within the container body is removed, and the mold is opened to remove the container body 7. The molded container body 1 is no provided with the grip 6 integrated by the connecting rings 7, 7 fitted in the annular grooves 5, 5.

Figure 7:
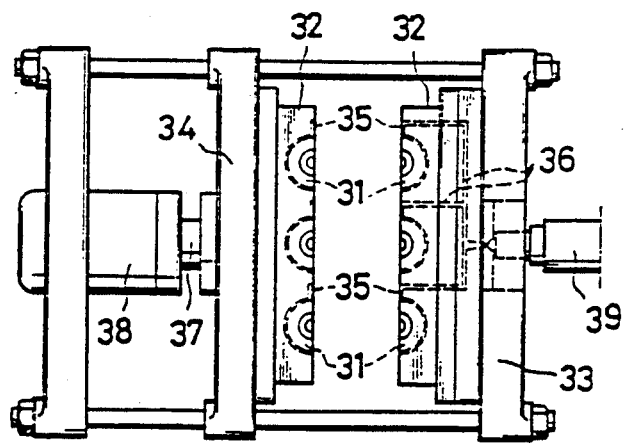
FIG. 7 is a plan view of a multi-cavity mold device for molding a grip.
Figure 3:
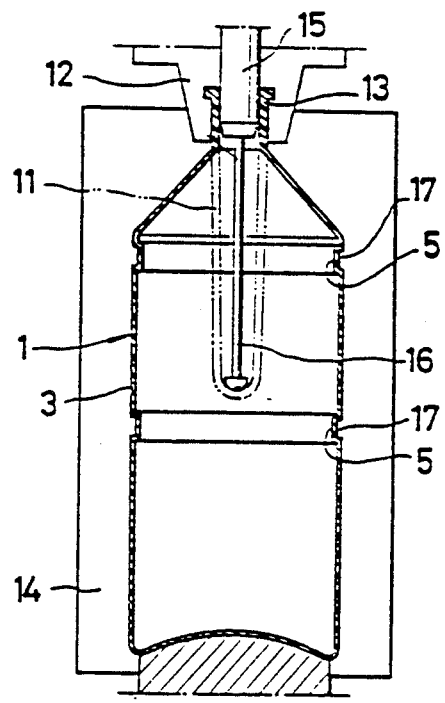
FIG. 3 is a longitudinal sectional front view when a container is being molded.
Figure 4:
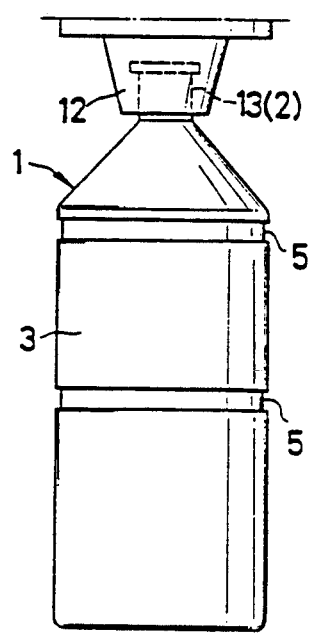
FIG. 4 is a front view of a container.

FIG. 7 shows an embodiment of a multi-cavity mold device for molding a grip. Split molds 32, 32 having three receiving-portion forming recesses 31, 31 are mounted on stationary plate and a movable plate 34, and a resin passage 36 communicated with each of grip molding cavities 35, 35 provided in the parting surface is provided in a split mold on the side of the stationary plate 33.

Insertion of the container into the grip molding mold device may be carried out from the side or the top. Opening and clamping of the mold may be carried out by a hydraulic cylinder 38 and a ram 37 in a manner similar to the normal case. Reference numeral 39 denotes an injection cylinder.

In this invention, the resin used to mold the container body 1 and the grip 6 can be of those of the same or different in quality, for example, the container body can be formed of polyethyleneterephtalate and the grip of polypropylene. In terms of molding, the resin used for the grip is one having a lower melting point than that of the resin used for the container, and for example, it is preferable that the container body 1 is molded of polyethyleneterephtalate and the grip of polyethylene.

What is claimed is:

1. A method of molding a synthetic resin hollow container with a grip, said method comprising the steps of:
   A) stretch blow molding an injection molded parison to form a hollow container body having an annular groove formed in the outer periphery thereof;
   B) placing said hollow container body in a split grip mold, said grip mold having:
      1) a molding groove surrounding said annular groove, said molding groove and annular groove defining a connecting ring molding cavity; and
      2) a grip section communicating with said molding groove and defining a grip molding cavity;
   C) applying an internal pressure above that of the ambient pressure to said hollow container body; and thereafter
   D) injection filling said grip and connecting ring molding cavities with molten resin while said internal pressure is applied to said hollow body to form a grip which is attached to said hollow container body by a connecting ring formed integrally with said grip and extending around said hollow container body and into said annular groove.

2. A method according to claim 1 wherein:
   A) a second annular groove is formed in said outer periphery of said container during said stretch blow molding step;
   B) said split grip mold includes a second molding groove surrounding said second annular groove, said second molding groove and said second annular groove defining a second connecting ring molding cavity which is spaced from said first molding ring cavity and which communicates with said grip section; and
   C) said injection filling step includes the step of injection filling said second connecting ring molding cavity with molten resin while said internal pressure is applied to said hollow body to form a second connecting ring which is integrally attached to said grip and which extends around said hollow container body and into said second annular groove.

3. A method according to claim 1, wherein the synthetic resin of which said container body and said grip are formed is one and the same synthetic resin.

4. A method according to claim 1 wherein the synthetic resin of which said grip is formed comprises a synthetic resin having a lower melting point than that of the synthetic resin of which said container body is formed.

5. A method according to claim 1, wherein said container body is formed of polyethyleneterephthalate, and said grip is formed of polyethylene or polypropylene.

* * * * *